United States Patent
Patton et al.

(10) Patent No.: US 8,794,666 B2
(45) Date of Patent: Aug. 5, 2014

(54) PYROTECHNIC GAS GENERATOR WITH COMBUSTION AND DIFFUSION CHAMBERS OF DIFFERENT SECTIONS

(75) Inventors: Yvonnig Patton, Plougastel Daoulas (FR); François Peremarty, Quimper (FR)

(73) Assignee: Autoliv Development AB, Vargarda (SE)

( * ) Notice: Subject to any disclaimer, the term of this patent is extended or adjusted under 35 U.S.C. 154(b) by 340 days.

(21) Appl. No.: 12/995,786

(22) PCT Filed: Jun. 5, 2009

(86) PCT No.: PCT/EP2009/056928
§ 371 (c)(1),
(2), (4) Date: Dec. 17, 2010

(87) PCT Pub. No.: WO2009/147233
PCT Pub. Date: Dec. 10, 2009

(65) Prior Publication Data
US 2011/0083576 A1    Apr. 14, 2011

(30) Foreign Application Priority Data
Jun. 6, 2008   (FR) ...................................... 08 53779

(51) Int. Cl.
*B60R 21/264*    (2006.01)
*B60R 21/239*    (2006.01)

(52) U.S. Cl.
CPC ........... *B60R 21/2644* (2013.01); *B60R 21/239* (2013.01)
USPC ......................................... 280/741; 280/742

(58) Field of Classification Search
CPC .............. B60R 21/2644; B60R 21/239; B60R 21/2646

USPC .......................................... 280/736, 741, 742
See application file for complete search history.

(56) References Cited

U.S. PATENT DOCUMENTS 5,615,912 A * 4/1997 O'Loughlin et al. ......... 280/737
5,762,368 A * 6/1998 Faigle et al. .................. 280/737
(Continued)

FOREIGN PATENT DOCUMENTS

WO         2005/035312 A    4/2005

OTHER PUBLICATIONS

International Search Report and Written Opinion of the ISA for PCT/EP2009/056928, ISA/EP, Rijswijk, NL, mailed Sep. 3, 2009.
(Continued)

*Primary Examiner* — Stephen M Johnson
(74) *Attorney, Agent, or Firm* — Harness, Dickey & Pierce, P.L.C.

(57) ABSTRACT

A pyrotechnic gas generator intended for motor-vehicle safety includes a combustion chamber of cylindrical or approximately cylindrical shape. An initiator is located within the combustion chamber and is associated with at least one solid pyrotechnic charge. A diffusion chamber communicates with the combustion chamber and receives gases generated by the pyrotechnic charge and transfers the gases to atmosphere via at least one evacuation opening. The diffusion chamber extends parallel to the longitudinal axis of the combustion chamber, in the extension of one of its end faces. The diffusion chamber is also of generally cylindrical or approximately cylindrical shape, but with a cross section that is less than that of the combustion chamber. The diffusion chamber is devoid of structure for filtering the gases that pass therethrough.

22 Claims, 1 Drawing Sheet

(56) References Cited

U.S. PATENT DOCUMENTS

| | | | |
|---|---|---|---|
| 5,844,164 A * | 12/1998 | Cabrera | 102/288 |
| 6,019,389 A * | 2/2000 | Burgi et al. | 280/736 |
| 6,062,143 A * | 5/2000 | Grace et al. | 102/530 |
| 6,068,291 A | 5/2000 | Lebaudy et al. | |
| 6,126,197 A | 10/2000 | Muir et al. | |
| 6,237,950 B1 | 5/2001 | Cook et al. | |
| 6,447,007 B1 * | 9/2002 | DiGiacomo et al. | 280/741 |
| 6,851,709 B2 * | 2/2005 | Ueda et al. | 280/736 |
| 6,874,813 B2 * | 4/2005 | Perotto et al. | 280/737 |
| 6,874,814 B2 * | 4/2005 | Hosey et al. | 280/737 |
| 7,140,638 B2 * | 11/2006 | Falkowski et al. | 280/736 |
| 2005/0082804 A1 | 4/2005 | Khandhadia | |

OTHER PUBLICATIONS

French Search Report and French Written Opinion for priority document FR 0853779, issued Mar. 10, 2009.

* cited by examiner

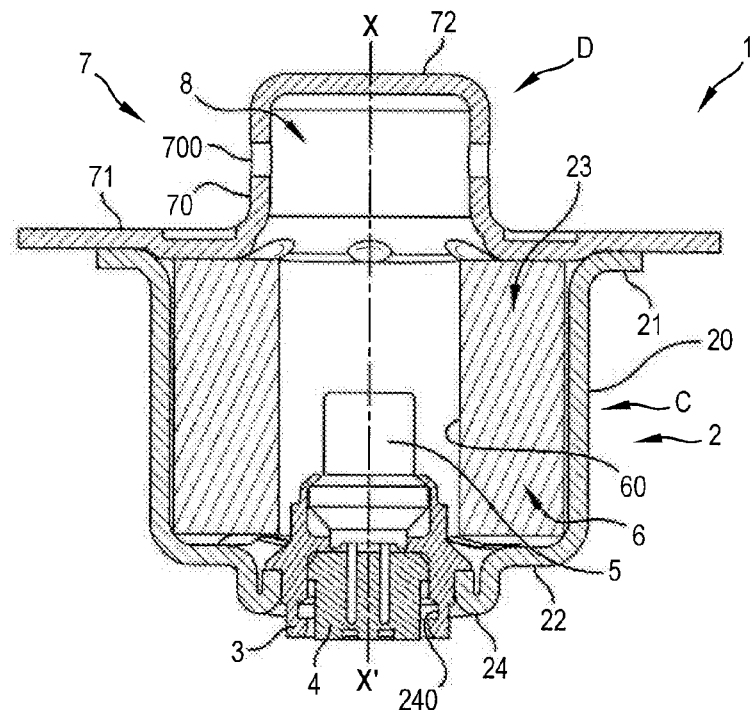
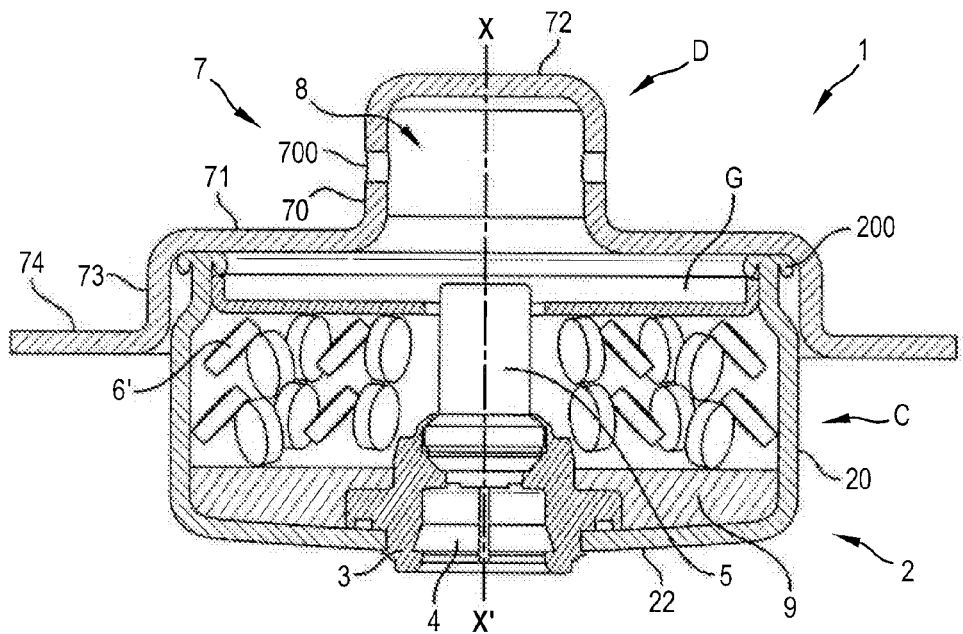

PYROTECHNIC GAS GENERATOR WITH COMBUSTION AND DIFFUSION CHAMBERS OF DIFFERENT SECTIONS

CROSS-REFERENCE TO RELATED APPLICATIONS

This application is a 371 U.S. National Stage of International Application No. PCT/EP2009/056928, filed Jun. 5, 2009. This application claims the benefit of French Patent Application No. 0853779, filed Jun. 6, 2008, the disclosures of which application are incorporated herein by reference.

FIELD

The present invention relates to a pyrotechnic gas generator intended for motor vehicle safety.

Said generator is preferably intended to allow inflating of a safety cushion generally called an airbag.

BACKGROUND

Generators are known which comprise a combustion chamber of cylindrical or approximately cylindrical shape, in which an initiator is contained associated with at least one solid pyrotechnic charge. Said generator also comprises a diffusion chamber which communicates with the combustion chamber; it receives gases generated by the charge and transfers these gases externally (here to an airbag) via at least one evacuation orifice.

Said generators are generally satisfactory.

However, the majority thereof consist of relatively numerous parts and items of equipment.

Additionally, the securing of said generator to a vehicle requires a container with frangible or mobile wall of substantial size to receive both this generator and the airbag that is folded away and is intended to be inflated.

This is not acceptable when the generator is intended to equip a vehicle whose public retail price is relatively low, and for which it is sought to reduce the cost price of this set of equipment.

SUMMARY

The purpose of the present invention is to overcome these difficulties by proposing a generator which functions in fully conventional manner, but whose structure is simplified and whose mounting inside a vehicle dashboard is made possible using a container of smaller volume.

Therefore, the present invention relates to a pyrotechnic gas generator intended for motor vehicle safety, which comprises a combustion chamber of cylindrical or approximately cylindrical shape, in which an initiator is contained associated with at least one solid pyrotechnic charge, and a diffusion chamber which communicates with the combustion chamber, and which receives the gases generated by said charge and transfers these gases towards the outside via at least one evacuation opening.

This generator is noteworthy in that said diffusion chamber:
- extends parallel to the longitudinal axis of said combustion chamber, in the continuation of one of its ends;
- is also of generally cylindrical or approximately cylindrical shape but whose cross section is shorter than that of said combustion chamber;
- is devoid of gas filtering means for the gases passing through it.

According to other advantageous, non-limiting characteristics:
- said combustion and diffusion chambers extend along the same axis;
- the cross-section of the said diffusion chamber is about one half shorter than that of said combustion chamber;
- said combustion chamber is essentially delimited by a box-shaped part with open top, and by a lid closing this top part which forms one piece with said diffusion chamber;
- it is provided with at least one protective cap that gives way only when the predetermined gas pressure is reached in the combustion chamber;
- said protective cap is arranged in the transition area between the two chambers;
- said protective cap extends inside the diffusion chamber and seals said evacuation orifice.

Other characteristics and advantages of the present invention will become apparent on reading the following description of some preferred embodiments.

DRAWINGS

This description is made with reference to the appended drawings in which:
FIG. 1 is a sectional view along a longitudinal, median plane of a first embodiment of the generator;
FIG. 2 is a similar view to FIG. 1 of a second embodiment of said generator.

DETAILED DESCRIPTION

The generator in FIG. 1 has a longitudinal axis of symmetry XX'.

This generator 1 essentially consists of a casing 2, and a lid 7 which are made in metal.

The casing 2 is of essentially cylindrical shape having an axis XX', and consists of a bottom part 22 which extends generally crosswise relative to the above-mentioned axis.

This bottom part connects to and is joined in one piece with a side wall 20 centred on axis XX'.

The upper part of this wall referenced 21 is flanged 90° outwardly to form a peripheral flange.

The top of this casing is open, the corresponding opening being referenced 23.

The bottom part 22 has an extension 24 extending opposite to the opening 23 and this extension comprises an axial opening 240 with circular contour in which the holder 3, 4 of an electropyrotechnic initiator 5 is partly engaged. These elements, whose structure is known per se, will not be further described.

By means of this assembly, the initiator 5 extends inside the casing 2 and is centred on axis XX'.

The casing 2 materializes the combustion chamber C of the generator 1. A pyrotechnic charge 6 is placed in this chamber, the charge shown here being monolithic.

It is a solid block of propellant of cylindrical shape comprising an axial cylindrical channel 60.

This form of embodiment is well known and is used to house the initiator 5 of the charge 6 in the above-mentioned channel.

The above-described casing 2 is completed by a lid 7 which, in this embodiment, is in a single piece with the diffusion chamber D of the generator.

In the present case, the lid has a generally planar bottom part 72 perpendicular to axis XX', which is joined to a side wall with revolution surface 70 which itself is extended by a wide peripheral flange 71 flanged 90° outwardly. It will be noted that the diameter of the lid 7 is greater than the diameter of the casing 2 at the flange 21.

It is this peripheral flange 71 which ensures sealing of the combustion chamber C.

Any means known to persons skilled in the art can be used to secure the lid 7 to the casing 2. Friction welding may be considered for example.

The side wall with surface of revolution 70 is pierced with openings 700 which communicate with the outside and whose function is to allow evacuation of the gases received by the diffusion chamber and which are generated at the combustion chamber. These openings or nozzles also ensure guiding of the combustion of the pyrotechnic charge. In manner known per se, the surface of these openings is sized in relation to the desired performance of the generator.

In the embodiment shown here, these openings 700 are sealed by a metal rupture disk 8 arranged on the inner side of the wall 70.

In this specific embodiment, the diffusion chamber D therefore projects relative to the combustion chamber C at one of its ends, and has a cross-section which is substantially one half smaller than the cross-section of the combustion chamber.

Also, according to the invention, the diffusion chamber is devoid of filtering means for the gases originating from the combustion chamber.

To limit the percentage of solid particles which may escape from the diffusion chamber, use is preferably made of a pyrotechnic charge 6 which generates very few of such particles.

As can be ascertained, said generator contains relatively few constituent parts. Additionally, since its diffusion chamber D is much less voluminous than the combustion chamber, it is possible to place only the diffusion chamber and the airbag in a casing contained in the vehicle's dashboard, it being possible to place the combustion chamber outside this casing. Therefore the size of this casing can be reduced In the embodiment shown FIG. 2, the structure is substantially equivalent to the structure shown FIG. 1. Therefore elements common to these two embodiments will not be further described. However, the casing 2 has a larger diameter that may even be greater than its longitudinal dimension.

Also, this casing contains a pyrotechnic charge 6' in the form of pellets and a packing material 9 whose function is to immobilize said pellets inasmuch as is possible.

The free upper end 200 of the side wall with surface of revolution 20 of the casing 2 forms a rim against which a grid G is placed i.e. an openwork plate whose function is to allow the gases to pass whilst retaining pellet pieces which would tend to endeavour to escape from the combustion chamber C.

The lid 7 has a relatively similar structure to the lid shown FIG. 2 except that the flange 71 is flanged two consecutive times to form edges 73 and 74 which tightly surround the rim 200 of the casing 2.

Here too a metal rupture disk 8 (protective cap) is fixed opposite the openings 700 of the diffusion chamber and inside the latter.

Said rupture disk is designed to yield as soon as a required pressure is reached in the combustion chamber C.

To avoid the escaping of fragments from said rupture disk into the airbag, it can be envisaged to position this disk not opposite the openings 700 but in the transition area between chamber C and chamber D i.e. just at the inlet to chamber D.

The advantages of said generator lies in its reduced size and weight, in its simplified design and in its easy installing which is made possible both at the driving position of a vehicle and opposite a passenger seat.

The invention claimed is:

1. A pyrotechnic gas generator comprising:
a first chamber having a generally cylindrical shape;
a pyrotechnic charge disposed in the first chamber prior to combustion of the pyrotechnic charge;
an initiator associated with the pyrotechnic charge;
a second chamber communicating with the first chamber, receiving gases generated by the pyrotechnic charge, and transferring the gases to atmosphere through at least one evacuation opening, the second chamber extending parallel to a longitudinal axis of the first chamber and having a generally cylindrical shape with a cross section less than a cross section of the first chamber at a junction of the first chamber and the second chamber; and
at least one protective cap that gives way only when the predetermined gas pressure is reached in the first chamber;
wherein the pyrotechnic charge is disposed proximate to the junction of the first chamber and the second chamber.

2. The generator according to claim 1, wherein the first chamber and the second chamber extend along a common axis.

3. The generator according to claim 1, wherein a cross-sectional diameter of the second chamber is less than about half a cross-sectional diameter of the first chamber.

4. The generator according to claim 1, wherein the first chamber is formed by a box-shaped part open at a top thereof, and by a lid for closure of the top, which is of one piece with the second chamber.

5. The generator according to claim 1, wherein the protective cap is disposed in a transition zone between the first chamber and the second chamber.

6. The generator according to claim 1, wherein the protective cap extends to an inside of the second chamber and closes off the evacuation opening.

7. The pyrotechnic gas generator of claim 1, wherein the pyrotechnic charge fills an area prior to combustion having an outer diameter greater than the cross section of the second chamber.

8. The pyrotechnic gas generator of claim 1, wherein the pyrotechnic charge is a generally cylindrical, monolithic charge having an outer diameter greater than the cross section of the second chamber.

9. The generator according to claim 1, further comprising a first casing defining the first chamber and a second casing defining the second chamber, the first casing having a peripheral flange in contact with a peripheral flange of the second casing.

10. The pyrotechnic gas generator of claim 1, wherein:
the pyrotechnic change is a solid pyrotechnic charge excluded from the second chamber prior to combustion of the pyrotechnic charge;
wherein the pyrotechnic charge fills an area prior to combustion having an outer diameter greater than the cross section of the second chamber; and
wherein the pyrotechnic charge is disposed proximate to the junction of the first chamber and the second chamber.

11. The generator according to claim 10, wherein the pyrotechnic charge is a generally cylindrical, monolithic charge having an outer diameter greater than the cross section of the second chamber.

12. The generator according to claim 10, wherein the first chamber and the second chamber extend along a common axis.

13. The generator according to claim 10, wherein a cross-sectional diameter of the second chamber is less than about half a cross-sectional diameter of the first chamber.

14. The generator according to claim 10, further comprising a first casing defining the first chamber and a second casing defining the second chamber, the first casing having a peripheral flange in contact with a peripheral flange of the second casing.

15. The pyrotechnic gas generator of claim 1, further comprising a housing elongated along an axis and having a first end and a second end, both ends symmetrically oriented about the axis, wherein:
   the first chamber is formed by a first portion of the housing;
   the pyrotechnic charge is a solid pyrotechnic charge excluded from the second chamber prior to combustion of the pyrotechnic charge;
   the initiator is proximate the first end of the housing; and
   wherein the pyrotechnic charge is disposed proximate to the junction of the first chamber and the second chamber.

16. The generator according to claim 15, wherein the pyrotechnic charge fills an area prior to combustion having an outer diameter greater than the cross section of the second chamber.

17. The generator according to claim 15, wherein the pyrotechnic charge is a generally cylindrical, monolithic charge having an outer diameter greater than the cross section of the second chamber.

18. The generator according to claim 15, wherein the first chamber and the second chamber extend along a common axis.

19. The generator according to claim 15, wherein a cross-sectional diameter of the second chamber is less than about half a cross-sectional diameter of the first chamber.

20. The generator according to claim 15, wherein the first portion of the housing has a peripheral flange and the second portion of the housing has a peripheral flange, the peripheral flange of the first portion being in contact with the peripheral flange of the second portion.

21. The generator according to claim 15, wherein the initiator is disposed proximate to the second end of the housing.

22. The generator according to claim 15, wherein the pyrotechnic charge is in contact with the second portion of the housing.

* * * * *